United States Patent
Su

(10) Patent No.: US 9,178,544 B1
(45) Date of Patent: Nov. 3, 2015

(54) PARAMETER OFFSET ESTIMATION THROUGH USE OF A SECONDARY SIGNAL COLLECTED FROM MULTIPLE SENSORS

(71) Applicant: The United States of America, as represented by the Secretary of the Army, Washington, DC (US)

(72) Inventor: Wei Su, Bel Air, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 463 days.

(21) Appl. No.: 13/788,520

(22) Filed: Mar. 7, 2013

(51) Int. Cl.
*H04B 3/46* (2015.01)
*H04B 1/10* (2006.01)
*H04L 1/00* (2006.01)
*H04L 27/26* (2006.01)
*H04W 4/00* (2009.01)

(52) U.S. Cl.
CPC ............ *H04B 1/1027* (2013.01); *H04L 1/0003* (2013.01); *H04L 27/2649* (2013.01); *H04W 4/005* (2013.01)

(58) Field of Classification Search
CPC ..... H04L 1/205; H04L 1/206; H04L 27/2601; H04L 1/0025; G01R 31/31709; G01R 29/26; H04B 3/462; H04B 1/40; H04B 3/23; H04B 1/403
USPC .................................. 375/226, 219, 295, 316
See application file for complete search history.

(56) References Cited

U.S. PATENT DOCUMENTS 8,085,882 B1 12/2011 Su
2007/0042706 A1* 2/2007 Ledeczi et al. ............... 455/3.01

OTHER PUBLICATIONS

Su et al., "Framework of Network Centric Signal Sensing for Automatic Modulation Classification," 2010 IEEE International Conference on Networking, Sensing and Control, Chicago, IL. Apr. 2010.
Xu, et al., "Distributed Automatic Modulation Classification with Multiple Sensors." IEEE Sensors Journal, vol. 10, Issue: 11, Nov. 2010, pp. 1779-1785.
Xu, et al., "Asynchronous and High Accuracy Digital Modulated Signal Detection by Sensor Networks," MILCOM 2011, Baltimore, MD, Nov. 2011.
Zhang, et al., "Optimal Decision Fusion based Automatic Modulation Classification by using Wireless Sensor Networks in Multipath Fading Channel," IEEE GlobeCom 2011, Huston, TX, Dec. 2011.

(Continued)

*Primary Examiner* — Zewdu Kassa
(74) *Attorney, Agent, or Firm* — Azza Jayaprakash

(57) ABSTRACT

Various embodiments associated with estimating a parameter offset for editions of a signal of interest through use of a secondary signal are described. A plurality of distributed asynchronous sensors can capture editions of a signal of interest as well as editions of a secondary signal. The secondary signal can be much stronger than the signal of interest. Since individual sensors capture the signal of interest editions and the secondary editions, offset calculated for one can be used for the other. With the secondary signal being stronger than the signal of interest, the offset of the editions of the signal of interest can be estimated. Once the offset is estimated for the secondary editions, the offset can be used for the signal of interest editions. After the offset is used to align the signal of interest editions, the signal of interest editions can be combined and further processing can occur.

20 Claims, 13 Drawing Sheets

(56) References Cited

OTHER PUBLICATIONS

Zhang, et al., "Multi-sensor Signal Fusion based Modulation Classification by using Wireless Sensor Networks in AWGN Channel," IEEE International Conference on Communications, Kyoto, Japan, Jun. 2011.

Su, et al., "Dual-use of Modulation Recognition Techniques for Digital Communication Signals," in Proc. IEEE LISAT, Long Island, NY, May 2006, pp. 1-6.

* cited by examiner

PARAMETER OFFSET ESTIMATION THROUGH USE OF A SECONDARY SIGNAL COLLECTED FROM MULTIPLE SENSORS

GOVERNMENT INTEREST

The innovation described herein may be manufactured, used, imported, sold, and licensed by or for the Government of the United States of America without the payment of any royalty thereon or therefore.

BACKGROUND

In a combat environment, different forces can broadcast different signals. In a singular environment, enemy combatants can each broadcast different signals. It may be possible for one combatant to intercept the signal of another combatant. The intercepting combatant may not know the modulation scheme of an intercepted signal. Without the modulation scheme, it may be difficult to put the intercepted signal to use.

SUMMARY

A system comprising an estimation component, an alteration component, and a non-transitory computer-readable medium is described. The estimation component is configured to estimate an offset of a first edition of a secondary signal to a second edition of the secondary signal, where the first edition of the secondary signal is collected along with a first edition of a signal of interest from a first sensor, where the second edition of the secondary signal is collected along with a second edition of the signal of interest from a second sensor, where the first edition of the signal of interest is weaker in signal strength than the first edition of the secondary signal, where the second edition of the signal of interest is weaker in signal strength than the second edition of the secondary signal, where the signal of interest and the secondary signal are different signals, and where the first sensor and the second sensor are different sensors. The alteration component is configured to alter the first edition of the signal of interest in accordance with the offset. The non-transitory computer-readable medium is configured to retain at least one executable instruction related to the collection component, the estimation component, the alteration component, or a combination thereof.

A system comprising a collection component, an estimation component, an alteration component, a fusion component, a match component, an identification component, a demodulation component, an output component, and a processor is described. The collection component is configured to collect a first edition of a secondary signal along with a first edition of a signal of interest from a first sensor and configured to collect a second edition of the secondary signal along with a second edition of the signal of interest from a second sensor, where the first edition of the signal of interest is weaker in signal strength than the first edition of the secondary signal, where the second edition of the signal of interest is weaker in signal strength than the secondary signal, where the signal of interest and the secondary signal are different signals, where a network of the signal of interest is unknown, where content of the secondary signal is unknown, and where the first sensor and the second sensor are different sensors. The estimation component is configured to estimate an offset of the second edition of the secondary signal to the first edition of the secondary signal, where the offset comprises a relative frequency offset and a relative phase offset. The alteration component is configured to alter the second edition of the signal of interest in accordance with the offset. The fusion component is configured to combine the altered second edition of the signal of interest with the first edition of the signal of interest. The match component is configured to match the combined signal of interest with a known signal. The identification component is configured to make an identification of a modulation scheme of the known signal. The demodulation component configured to demodulate the combined signal of interest through use of the modulation scheme of the known signal. The output component configured to cause the demodulated signal of interest to be outputted. The processor configured to execute at least one instruction related to at least one of the components of the system.

A non-transitory computer-readable medium configured to store computer-executable instructions that when executed by a processor cause the processor to perform a method is described. The method comprises sending a request for a signal of interest as well as collecting a first edition of the signal of interest along with a first edition of a secondary signal from a first sensor, where the first edition of the secondary signal is stronger than the first edition of the signal of interest, where the signal of interest and the secondary signal are different signals, and where the first sensor sends the first edition of the signal of interest along with the first edition of the secondary signal as a first response to the request for the signal of interest. The method also comprises collecting a second edition of the signal of interest along with a second edition of the secondary signal from a second sensor, where the second edition of the secondary signal is stronger than the second edition of the signal of interest, where the first sensor and the second sensor are different sensors, and where the second sensor sends the second edition of the signal of interest along with the second edition of the secondary signal as a second response to the request for the signal of interest. The method further comprises collecting a third edition of the signal of interest along with a third edition of the secondary signal from a third sensor, where the third edition of the secondary signal is stronger than the third edition of the signal of interest, where the first sensor and third sensor are different sensors where the second sensor and the third sensor are different sensors, where the third sensor sends the third edition of the signal of interest along with the third edition of the secondary signal as a third response to the request for the signal of interest, and where the first sensor, second sensor, and third sensor are asynchronous. The method additionally comprises estimating a second edition parameter offset of the second edition of the secondary signal against the first edition of the secondary signal and altering the second edition of the signal of interest in accordance with the second edition parameter offset, where the second edition parameter offset comprises a relative frequency second edition parameter offset and a relative phase second edition parameter offset. In addition, the method comprises estimating a third edition parameter offset of the third edition of the secondary signal against the first edition of the secondary signal and altering the third edition of the signal of interest in accordance with the third edition parameter offset, where the third edition parameter offset comprises a relative frequency third edition parameter offset and a relative phase third edition parameter offset and where the third edition parameter offset is unequal to the second edition parameter offset. Further, the method comprises coarsely measuring a signal to noise ratio (SNR) for the first edition of the signal of interest, the second edition of the signal of interest after alteration, and the third edition of the signal of interest after alteration. Additionally, the method comprises identifying two editions of the signal of interest with the highest SNRs and combining the two editions of the signal of interest with the highest SNR into a combined signal. The method additionally comprises making a comparison of a SNR of the combined signal against a threshold, where the comparison produces a comparison result. In addition, the method comprises combining the edition of the signal of interest not already combined into the combined signal in response to the comparison result being that the SNR of the combined signal does not meet the threshold. The method further comprises identifying a constellation of the combined signal in response to the comparison result being that the SNR of the combined signal does meet the threshold or in response to there being no editions remaining to combine with the combined signal. The method additionally comprises matching the constellation of the combined signal with a constellation of a known signal. The method also comprises selecting a demodulation scheme associated with the known signal and using the demodulation scheme to demodulate the combined signal through use of the demodulation scheme. The method further comprises outputting the combined signal after demodulation.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Asynchronous low-cost sensors in distributed locations can be used in sensing and classifying a very weak signal. This weak signal may not be difficult to identify by using a single sensor alone, but can be better detected and classified by fusing multiple weak signal editions collected by a sensor network comprising the sensors. The signal editions, that can be asynchronous due to the sensors being asynchronous, can have relative offsets in frequency and phase due to diversities and drifts in the distributed local oscillators. An offset estimation can be used to estimate and compensate for relative frequency and phase offsets in fusing signal editions together by referencing to a secondary signal with stronger transmitting power than a signal of interest, where the signal editions are of the signal of interest. If the secondary signal interferes the signal of interest, then the secondary signal can be suppressed using a reciprocal copy of the secondary signal. Therefore, the distributed signal copies can be coherently combined to achieve a higher processing gain for reliable signal exploitation.

Simple, inexpensive, low-maintenance, and heterogeneous sensors can be deployed to cover a wide-spread geographical area seamlessly and multiple narrow-band receivers can be collaborated to handle a wide frequency band effectively. The distributed sensors can be clustered and orchestrated by a fusion center which has sufficient processing power to process received signal editions. The fusion center can send periodic requesting signal (RS) to L distributed sensors, R1, R2, . . . , and RL to acquire a signal of interest (SOI) that is weak. Upon the reception of the request, the distributed sensors take short time duration snapshots of the SOI. The distributed sensors can be configured to provide very limited signal processing capabilities such as radio frequency reception and transmission, frequency tuning and down-conversion, filtering, and digitization. Thus, the sensors can be asynchronous and non-cooperative to one another and are used for communicating with, or relaying distributed snapshots to, the fusion center. Since the frequency down-conversion local oscillators (LOs) can be different due to heterogeneous and asynchronous aspects of the sensors, the fusion center can estimate and compensate the relative frequency offset (RFO) and the relative phase offset (RPO) induced by different LOs at the distributed sensor locations before combining the signal copies coherently. However, if the SOI is very weak or transmitted in a frequency adjacent to a strong signal, the offset estimation may become unreliable. The nearby strong signal, known as a secondary signal (SS), can be leveraged as a reference to estimate RFO and RPO of the distributed sensors and further suppress the SS if the SS interferes the SOI.

Figure 1:
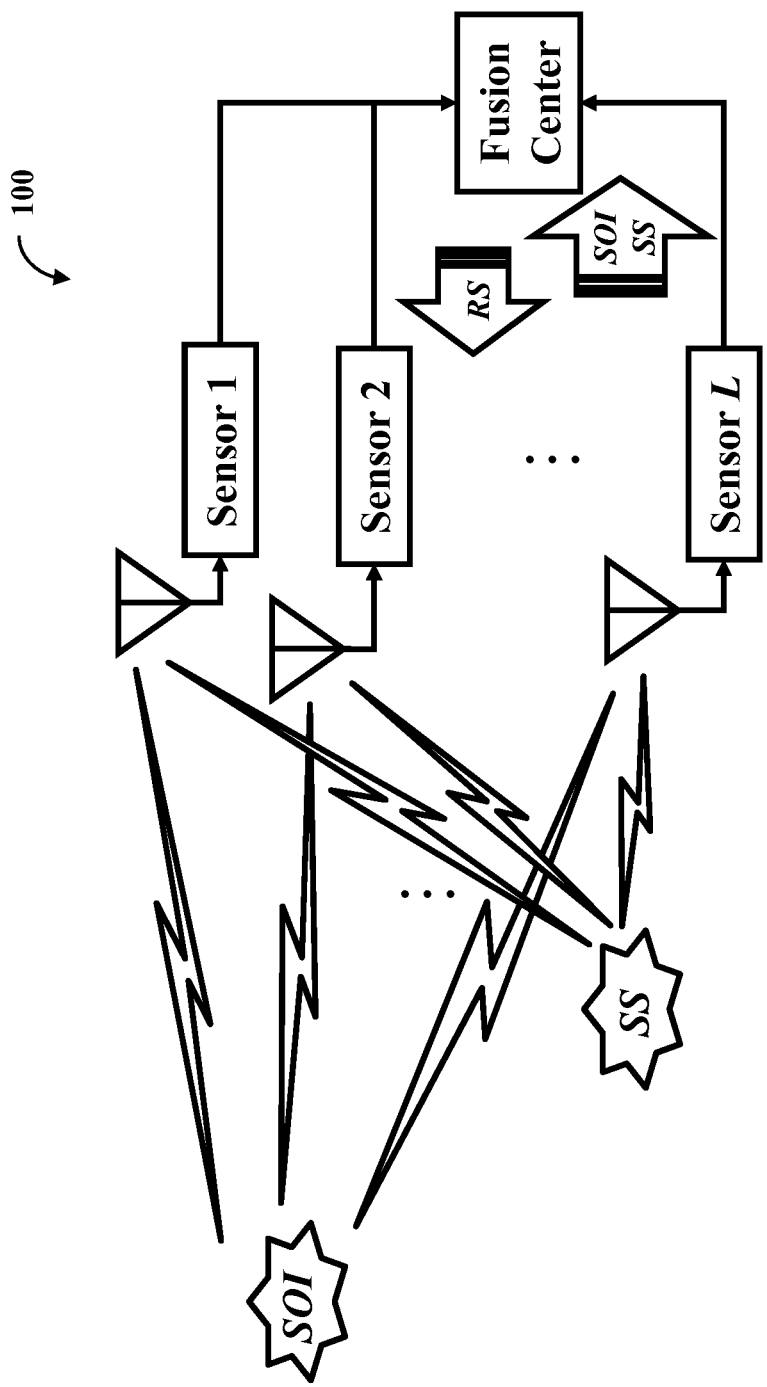
FIG. 1 illustrates one embodiment of a system comprising sensors and a fusion center.

FIG. 1 illustrates one embodiment of a system 100 comprising sensors and a fusion center. The sensors can be dumb sensors (e.g., sensors that perform little to no signal processing and merely forward signal editions to the fusion sensor) and the fusion center can be a smart fusion center (e.g., where relatively large amounts of processing occur). In the dumb sensor and smart fusion center scenario, the sensors can be asynchronous and the fusion center can combine the signal copies after a post-synchronization process. When the asynchronous signal copies are very weak, the post-synchronization can become difficult and unreliable. The SS can be used by the fusion center and the SOI copies can be collected together with SS copies so that the RFO and RPO can be estimated using the SS. However, the content or internal of the SS is may not be known. The SOI and SS can be collected in a single snapshot or in different time periods (e.g., when not too far apart), in the same signal copy (e.g., if the SOI and SS are very close in the frequency band) or in separate copies. The sensors can be configured to not make local decisions. The sensors can store the short snapshots, $r_i(t)$, $i=1, 2, \ldots, L$, as time-stamped data packets and forward these packets to the fusion center for processing. The packets can be transmitted to the fusion center using a communication method. Without loss of generality, $R_1$ can function as a reference sensor, $R_2$, $R_3, \ldots$, and $R_L$ are compared to $R_1$ for calculating offsets. A signal packet received at the fusion center includes a SOI copy and a SS copy. This packet can be described by $$r_i(t) = \Delta\alpha_i e^{j(\Delta\omega_i t + \Delta\beta_i)}[s(t+\Delta\tau_i) + s_s(t+\Delta\tau_{s,i})] + n_i(t) \quad (1)$$

where $\Delta\omega_i$ and $\Delta\beta_i$ are RFO and RPO induced by LOs, $\Delta\tau_i$ is the relative time offset (RTO), $\Delta\tau_{s,i}$ is the relative time offset for SS, and $\Delta\alpha_i$ is the relative magnitude offset (RMO). When $i=1$, $\Delta\alpha_1=1$ and $\Delta\omega_1=\Delta\beta_1=\Delta\tau_1=\Delta\tau_{s,1}=0$. Relative offsets refers to $$r_1(t) = s(t) + s_s(t) + n_1(t) \quad (2)$$

where $s(t) = \alpha_0 s_0(t+\tau_0) e^{j(\omega_0 t + \beta_0)}$ and $s_s(t)$ are the frequency down-converted copies of the SOI and SS, respectively, $s_0(t)$ is a sequence of pulse shaped information symbols, $\alpha_0$, $\omega_0$, $\beta_0$, $\tau_0$ are gain, frequency, phase, and time offsets between the SOI and $R_1$, respectively, and $n_i \sim \mathcal{N}(0, \sigma_i)$ is i.i.d. circularly symmetric complex additive white Gaussian noise (AWGN). Since the periodical short snapshots of SOI are used, there can ample time between any two snapshots for signal processing and analysis. Aspects disclosed herein can be conducted in real-time.

Figure 2:
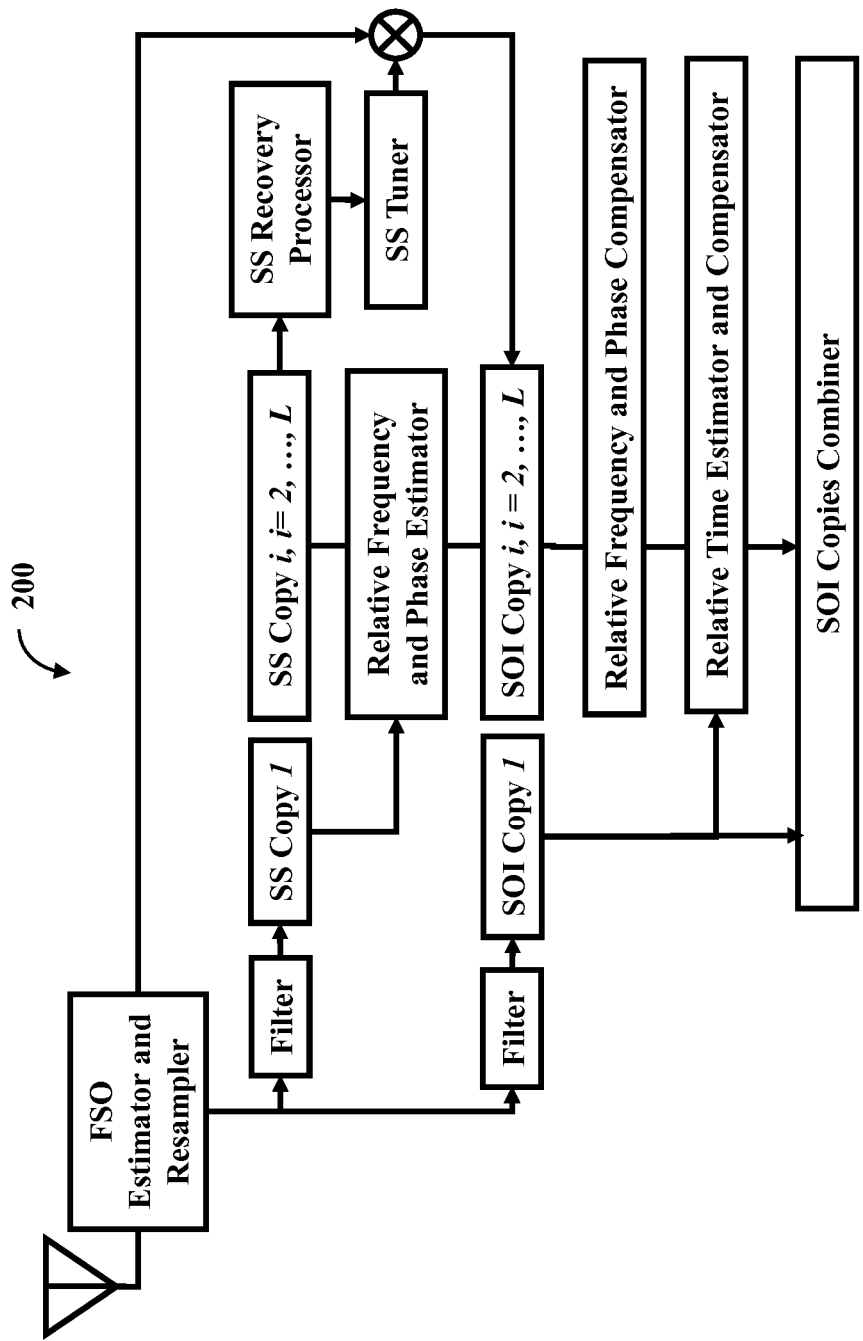
FIG. 2 illustrates one embodiment of a fusion center.

FIG. 2 illustrates one embodiment of a fusion center 200. The fusion center can comprise an antenna, a Relative Sampling-time Offset (RSO) Estimator and Resampler, filters for both SS and SOI, registers for SS copies and SOI copies, estimators and compensators for RFO and RPO, and a SS Recovery Process and SS Tuner. The SOI and SS copies received at the fusion center can be sent to the FSO estimator and resampler to correct the sampling offset such that the samples from different signal copies are lined up in time for further processing. The symbol rate of the SOI can be used as a reference for estimating RSO. The signal copies with RSOs can be interpreted and re-sampled after RSO estimation. The received signal copy, $r_i$, can be filtered to form two signals: an SS copy, $r_{s,i}(t) = \Delta\alpha_i e^{j(\Delta\omega_i t + \Delta\beta_i)} s_s(t+\Delta\tau_{s,i})$, and a SOI copy, $r_{o,i}(t) = \Delta\alpha_i e^{j(\Delta\omega_i t + \Delta\beta_i)} s(t+\Delta\tau_i)$. The SS copies can be stored in SS-copy registers and SOI copies can be stored in SOI-copy registers for signal processing.

The SS copies from L sensors can be sent to Relative Frequency and Phase Estimator for estimating the RFO and RTO induced by LOs. The estimates of RFO and RPO can be obtained by searching, $\Delta\hat{\omega}_i$, the best estimate of $\Delta\omega_i$, such that $$\Omega(\Delta\hat{\omega}_i) \approx \int_{\omega \in W_0} R_1(\omega) R_1^*(\omega) R_i(\omega + \Delta\hat{\omega}_i) R_i^*(\omega + \Delta\hat{\omega}_i) d\omega \quad (3)$$

is a maximum within the searching window $W_0$. Where $R_i(\omega)$ is the Fast Fourier transform (FFT) of $r_{s,i}(t)$ and '*' is the complex conjugate operator. By taking the inverse fast Fourier transform (IFFT) of $$Q_i(\omega) = R_1^*(\omega) R_i(\omega + \Delta\hat{\omega}_i) \quad (4)$$

the best estimate of $\Delta\tau_{s,i}$, denoted by $\Delta\hat{\tau}_{s,i}$, can be found at highest peak within the searching area, and, $\Delta\hat{\beta}_i$, the best estimate of $\Delta\beta_i$ is the phase of IFFT at $\Delta\hat{\tau}_{s,i}$. While using best estimates and other uses of best and the like are used herein, it is to be appreciated by one of ordinary skill in the art that non-best estimates can be used.

If the RFO and RPO of LOs are not changed in the short observation time period, the estimates $\Delta\hat{\omega}_i$ and $\Delta\hat{\beta}_i$ can be used to compensate the RFO and RPO of SOI copies in the Relative Frequency and Phase Compensator as below $$\eta_i(t) = e^{-j(\Delta\hat{\omega}_i t + \Delta\hat{\beta}_i)} r_{o,i}(t) = \Delta\alpha_i e^{j(\Delta\omega_i - \Delta\hat{\omega}_i)t + \Delta\beta_i - \Delta\hat{\beta}_i} s(t + \Delta\tau_i) + e^{-j(\Delta\hat{\omega}_i t + \Delta\hat{\beta}_i)} n_i(t) \quad (5)$$

If the RTO is also to be compensated, the RTO can be estimated by searching the best $\hat{\tau}_i$ using Relative Time Estimator and Compensator, such that the correlation magnitude of $$\chi(\Delta\hat{\tau}_i) = \left\| \int_{t \in T_0} \eta_1^*(t) \eta_i(t - \Delta\hat{\tau}_i) dt \right\| \quad (6)$$

is a maximum within the search window $T_0$. The L copies of SOI collected in the distributed locations can be combined coherently at SOI Copies Combiner as below $$r^c(t) = \sum_{i=1}^{L} e^{-j\Delta\hat{\omega}_i(t_i - \Delta\hat{\tau}_i) + \Delta\hat{\beta}_i} r_{o,i}(t - \Delta\hat{\tau}_i) + n^c(t) \quad (7)$$

to form a more accurate estimation of SOI for exploitation. Where $n^c(t)$ is the combined noise diminishing with a large L. All available sensor signals may not be combined. Combining the signals with higher SNRs or less channel distortion can occur and this combination can end when the SNR of the combined signal exceed the required threshold. The estimation of the offsets can be calculated use parallel processing. The combined signal can be used for the signal sensing, classification, and localization.

In the situation that the SS interferes the SOI, the SS Recovery Processor uses the reciprocal SS copies to suppress the SS portion of the received signal in order to maximize the SOI portion. The SS Tuner can adjust the gain, phase, and timing of the reciprocal SS copies in order to achieve the best suppression result.

The fusion center can be designed to have sufficient computational power and bandwidth to handle and process the signal copies provided by the sensors in a relatively short time. SS and SOI registers that store SS Copy 1 to SS Copy L and SOI Copy 1 to SOI Copy L are non-transitory computer-readable mediums (e.g., memories or storage devices). Estimators, compensators, and the combiner of the fusion center can be signal processors which can be, but is not limited to, digital signal processor (DSP), field-programmable gate array (FPGA), Personal computer (PC), firmware, and computer software, and other computing devices.

When the channel is not AWGN, the channel phases can be added to the signal snapshots observed in the distributed locations and the additional RPO estimation can be applied or an adaptive filter will be used to compensate the channel phase.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

A plurality of distributed asynchronous sensors can capture editions of a signal of interest as well as editions of a secondary signal. The secondary signal can be much stronger than the signal of interest. Since individual sensors capture the signal of interest editions and the secondary signal editions, offset calculated for one can be used for the other. With the secondary signal being stronger than the signal of interest, the offset of the editions of the signal of interest can be estimated. Once the offset is estimated for the secondary signal editions, the offset can be used for the signal of interest editions. After the offset is used to align the signal of interest editions, the signal of interest editions can be combined and further processing can occur.

Figure 3:
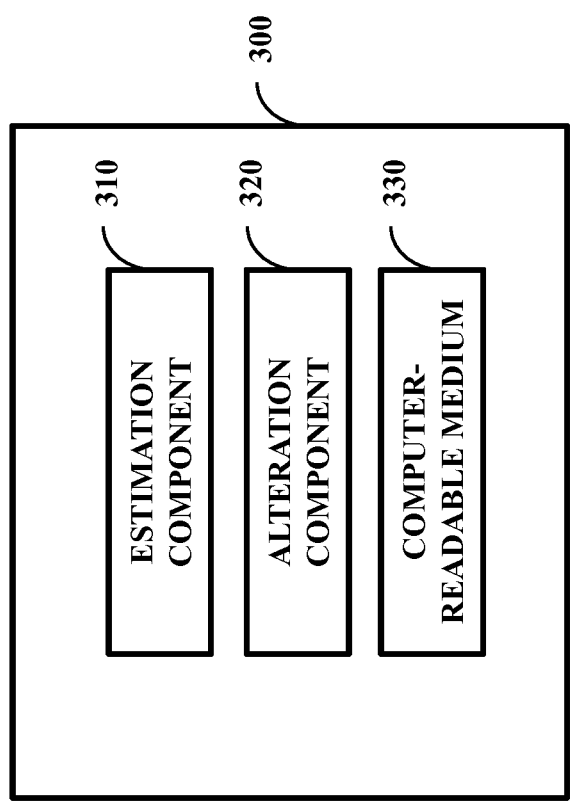
FIG. 3 illustrates one embodiment of a system comprising an estimation component, an alteration component, and a computer-readable medium.

FIG. 3 illustrates one embodiment of a system 300 comprising an estimation component 310, an alteration component 320, and a computer-readable medium 330. The estimation component 310 is configured to estimate an offset of a first edition of a secondary signal to a second edition of the secondary signal. The first edition of the secondary signal is collected along with a first edition of a signal of interest from a first sensor. The second edition of the secondary signal is collected along with a second edition of the signal of interest from a second sensor. The first edition of the signal of interest is weaker in signal strength than the first edition of the secondary signal. The second edition of the signal of interest is weaker in signal strength than the second edition of the secondary signal. The signal of interest and the secondary signal are different signals and the first sensor and the second sensor are different sensors. The alteration component 320 is configured to alter the first edition of the signal of interest (e.g., or the second edition of the signal of interest) in accordance with the offset. The non-transitory computer-readable medium 330 (e.g., non-transitory computer-readable medium) is configured to retain at least one executable instruction related to the collection component, the estimation component, the alteration component, or a combination thereof.

In one embodiment, the system 300 (or other component disclosed herein) can be part of the fusion center of the system 100 of FIG. 1 and/or be part of the system 200 of FIG. 2. A request signal can be sent by the system 300 to a group of asynchronous sensors (e.g., directly sent to the sensors, sent generally to any sensor within a range, etc.). The request can be directed to the signal of interest, directed to the signal of interest and the secondary signal, or be a request for signal(s) captured to be transferred. In response, to the request signal, the sensors can capture a snapshot of the signal of interest and the secondary signal and/or send a data packet that includes the snapshot. The system 300 can evaluate the signal of interest. If the signal of interest is too weak, then the system 300 can process the secondary signal editions and then process the signal of interest editions.

In one embodiment, the first edition of the signal of interest and the first edition of the secondary signal are captured by the first sensor in a single snapshot. In one embodiment, the first edition of the signal of interest and the first edition of the secondary signal are captured by the first sensor in the same signal copy. This can also be true of the second editions of the signal of interest and secondary signal.

In one embodiment, the second edition of the signal of interest and the second edition of the secondary signal are captured by the second sensor at different times. In one embodiment, the second edition of the signal of interest and the second edition of the secondary signal are captured by the second sensor in different signal copies. This can also be true of the first editions of the signal of interest and secondary signal.

Different sensors can employ different capture techniques for the same signal of interest and secondary signal. For example, while the first sensor can capture the signal of interest and the secondary signal in the same signal copy the second sensor can capture the signal of interest and the secondary signal copy in different signal copies. These copies can be sent to the system 300 and the system 300 can process the editions of their content.

In one embodiment, the first sensor and the second sensor are part of different networks. In one example, the first sensor is part of a cellular telephone network of a first company while the second sensor is part of a cellular telephone network of a second company. In one example, the first sensor is part of a cellular telephone network of a first company while the second sensor is part of a non-cellular telephone network of a third company. In one embodiment the first sensor is part of a first electronic device (e.g., of a first network) with a primary purpose other than functioning as a sensor of the first edition of the signal of interest and the second sensor is part of a second electronic device (e.g., of the first network, of a second network different from the first network, etc.) with a primary purpose other than functioning as a sensor of the second edition of the signal of interest, where the first electronic device and the second device are different electronic devices. Thus, sensors can be part of already existent equipment. For example, various electronic devices can be carried by soldiers in the battlefield. These electronic devices can be employed as sensors (e.g., when they are not being used for their primary purpose). The devices can send signal editions to commanding center far away from the battlefield and the editions can be processed.

In one embodiment, little can be known about the signal of interest and/or secondary signal. In one example, a network of the signal of interest and/or the secondary signal can be unknown. In one example, the content of the secondary signal can be unknown. The offset (e.g., parameter offset) calculated for the secondary signal, and thus applied to the signal of interest, can comprise a relative frequency offset, a relative phase offset, a relative time offset, etc.

Figure 4:
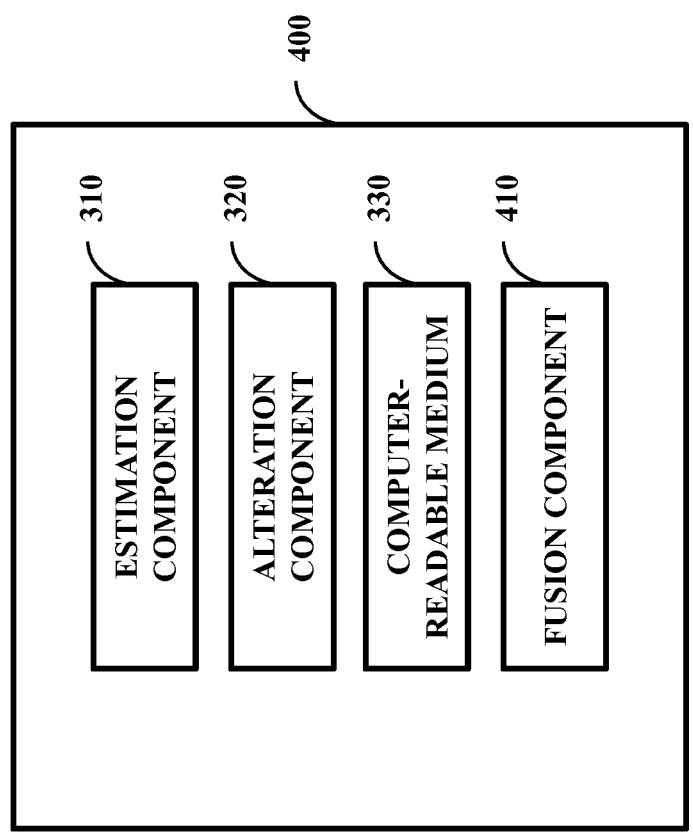
FIG. 4 illustrates one embodiment of a system comprising the estimation component, the alteration component, the computer-readable medium, and a fusion component.

FIG. 4 illustrates one embodiment of a system 400 comprising the estimation component 310, the alteration component 320, the computer-readable medium 330, and a fusion component 410. The fusion component 410 can be configured to combine the altered first edition of the signal of interest with the second edition of the signal of interest.

In one embodiment, the second editions (e.g., or other editions, such as the first editions) can be treated as a base signal to which other signal editions can be compared (e.g., the first editions). Thus, other signals can be altered according to their offset from the second editions. The base signal can be changed as more editions are collected or remain constant for analysis of a signal of interest. In one embodiment, the first edition of the signal of interest and second edition of the signal of interest are modified in accordance with their offset from one another.

Figure 5:
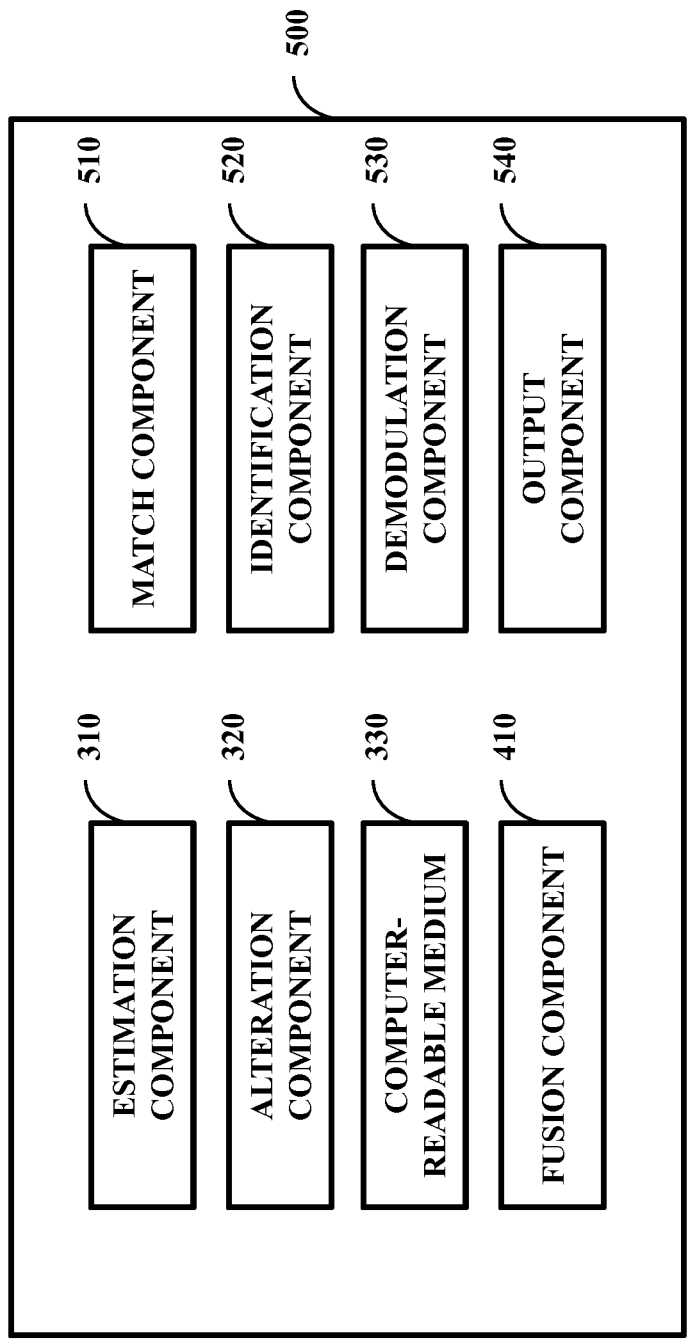
FIG. 5 illustrates one embodiment of a system comprising the estimation component, the alteration component, the computer-readable medium, the fusion component, a match component, an identification component, a demodulation component, and an output component.

FIG. 5 illustrates one embodiment of a system 500 comprising the estimation component 310, the alteration component 320, the computer-readable medium 330, the fusion component 410, a match component 510, an identification component 520, a demodulation component 530, and an output component 540. The match component 510 is configured to match the combined signal of interest with a known signal. The identification component 520 is configured to make an identification of a modulation scheme of the known signal. The demodulation component 530 is configured to demodulate the combined signal of interest through use of the modulation scheme of the known signal. The output component 540 is configured to cause the demodulated signal of interest to be outputted.

The signal of interest may be from an unknown network, such as a signal from an enemy combatant in a military operation. With the signal of interest being from an unknown network a modulation scheme associated with the signal of interest may not be known. A constellation of the signal of interest (e.g., after fusion of multiple editions of the signal of interest) can be identified and compared with constellations of known signals retained in a database (e.g., the computer-readable medium 330). The constellations of known signals can be associated with a modulation scheme. A constellation of a known signal best matching the constellation of the signal of interest can be designated and a modulation scheme of the best matching known signal can be used to demodulate the signal of interest.

Figure 6:
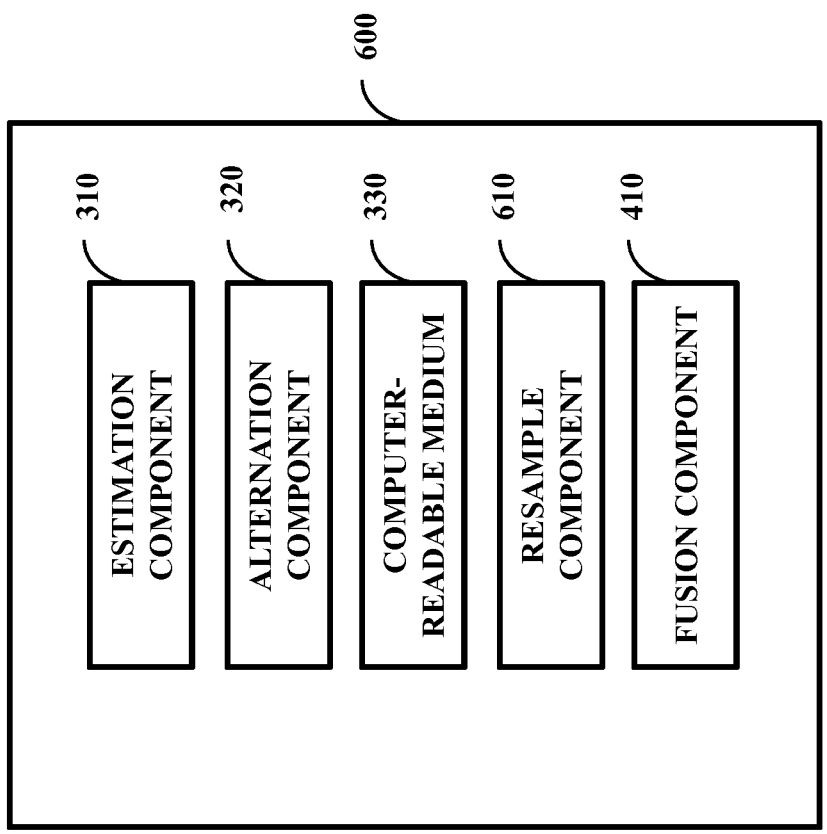
FIG. 6 illustrates one embodiment of a system comprising the estimation component, the alteration component, the computer-readable medium, a resample component, and the fusion component.

FIG. 6 illustrates one embodiment of a system 600 comprising the estimation component 310, the alteration component 320, the computer-readable medium 330, a resample component 610, and the fusion component 410. The resample component 610 is configured to resample the altered first edition of the signal of interest. The fusion component 410 is configured to combine the altered first edition of the signal of interest after being resampled with the second edition of the signal of interest.

In one embodiment, different signal editions can have be offset in time due to when signals are captured by the asynchronous sensors. Thus, one or more editions can be resampled such that the editions are aligned in time. Once aligned in time, editions can be more easily processed (e.g., combined together by the fusion component 410).

Figure 7:
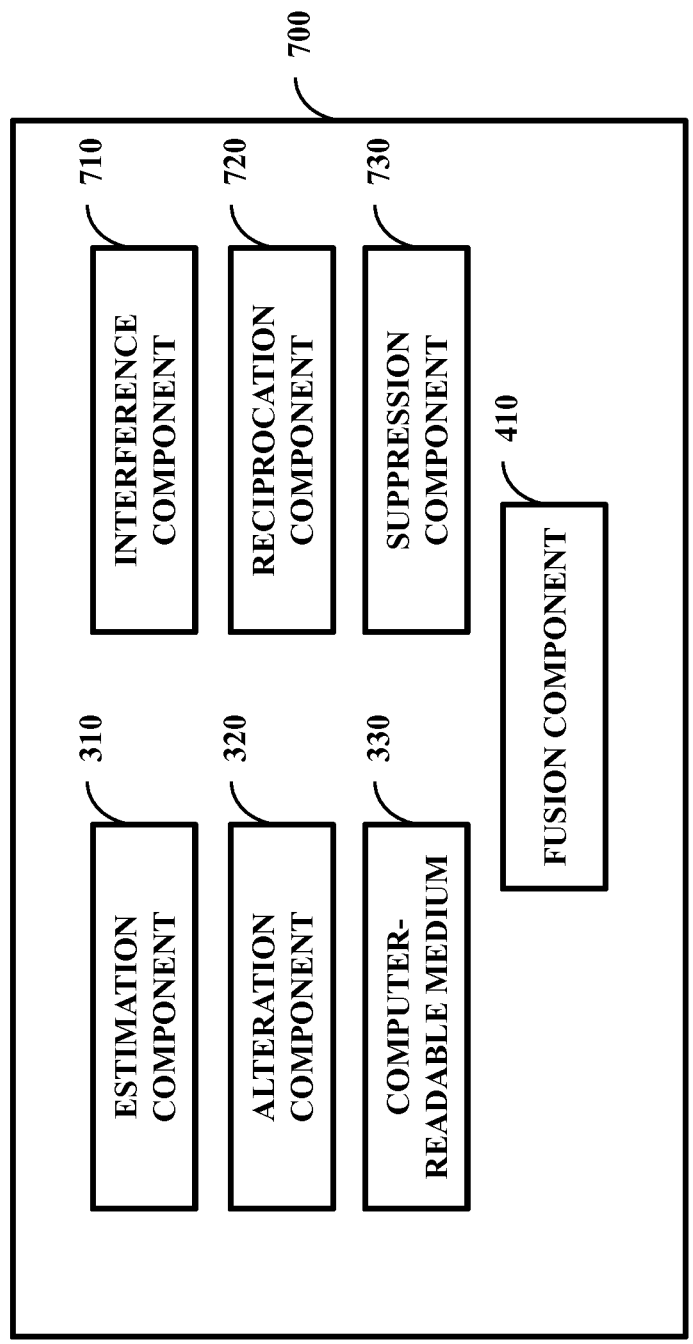
FIG. 7 illustrates one embodiment of a system comprising the estimation component, the alteration component, the computer-readable medium, an interference component, a reciprocation component, a suppression component, and the fusion component.

FIG. 7 illustrates one embodiment of a system 700 comprising the estimation component 310, the alteration component 320, the computer-readable medium 330, an interference component 710, a reciprocation component 720, a suppression component 730, and the fusion component 410. The interference component 710 is configured to make an identification that the secondary signal interferes with the signal of interest. The reciprocation component 720 is configured to take a reciprocal of the first edition of the secondary signal and to take a reciprocal of the second edition of the secondary signal. The suppression component 730 is configured to suppress the first edition of the secondary signal through use of the reciprocal of the first edition of the secondary signal and configured to suppress the second edition of the secondary signal through use of the reciprocal of the second edition of the secondary signal. The alteration component 320 is configured to alter the first edition of the signal of interest in accordance with the offset after the first edition of the secondary signal is suppressed. The fusion component 410 is configured to combine the altered first edition of the signal of interest with the second edition of the signal of interest after the second edition of the secondary signal is suppressed.

With the secondary signal being stronger in signal strength than the signal of interest, it may be possible for the secondary signal to interfere with the signal of interest. Since the signal of interest can be a desirable signal and the secondary signal can be merely used to better process the signal of interest, the secondary signal can be considered of little value. Thus, if the secondary signal interferes with the signal of interest, then it can be difficult to access the signal of interest. Therefore, the interference can be identified (e.g., interference surpasses a threshold level, the signal of interest cannot be used without interference being lessened or removed, etc.) and appropriate measures can be taken (e.g., take reciprocal of secondary signal editions and then delete secondary signal editions).

Figure 8:
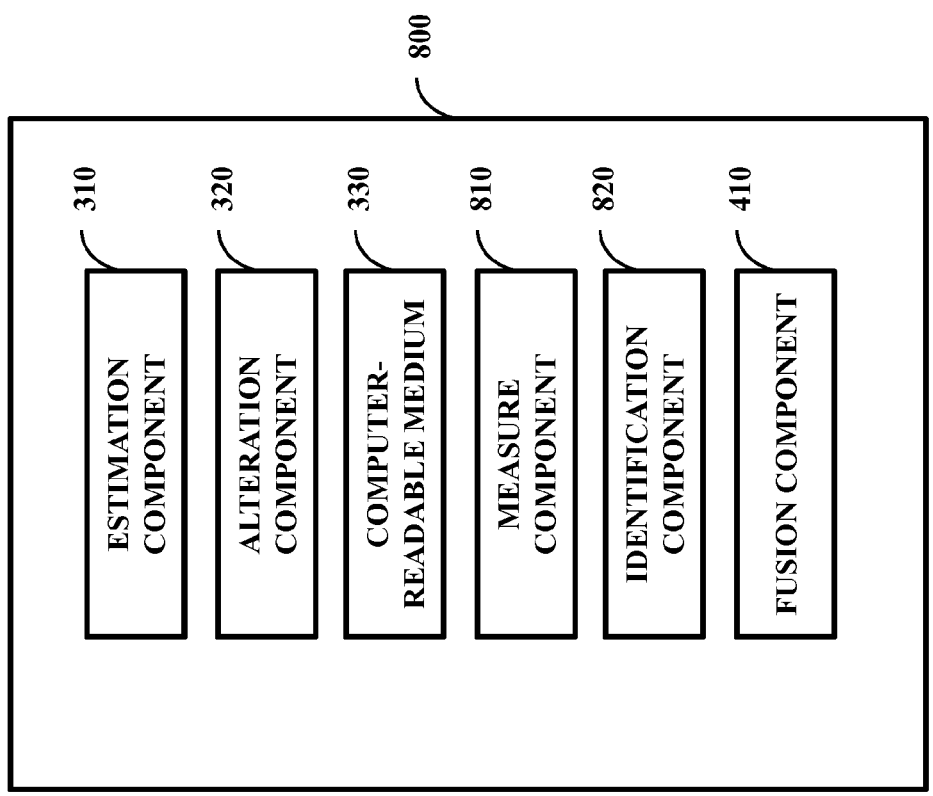
FIG. 8 illustrates one embodiment of a system comprising the estimation component, the alteration component, the computer-readable medium, a measure component, an identification component, and the fusion component.

FIG. 8 illustrates one embodiment of a system 800 comprising the estimation component 310, the alteration component 320, the computer-readable medium 330, a measure component 810, an identification component 820, and the fusion component 410. The measure component 810 is configure to measure a signal to noise ratio (SNR) for the first edition of the signal of interest, measure (e.g., coarsely measure) an SNR for the second edition of the signal of interest, and measure (e.g., coarsely measure) an SNR for a third edition of the signal of interest. The third edition of the signal of interest is collected by a third sensor, where the third sensor is different from the first sensor and where the third sensor is different from the second sensor. The identification component 820 is configured to identify two editions of the signal of interest with the highest SNRs among the first edition of the signal of interest, the second edition of the signal of interest, and the third edition of the signal of interest. The fusion component 410 can be configured to combine the two editions of the signal of interest with the highest SNR into a combined signal. In one embodiment, at least one of the two editions of the signal of interest with the highest SNR is offset altered after collection (e.g., the first edition of the signal of interest is altered in accordance with the offset, the third edition of the signal of interest is altered in accordance with another offset calculated through comparison of the second edition and third edition, etc.).

Figure 9:
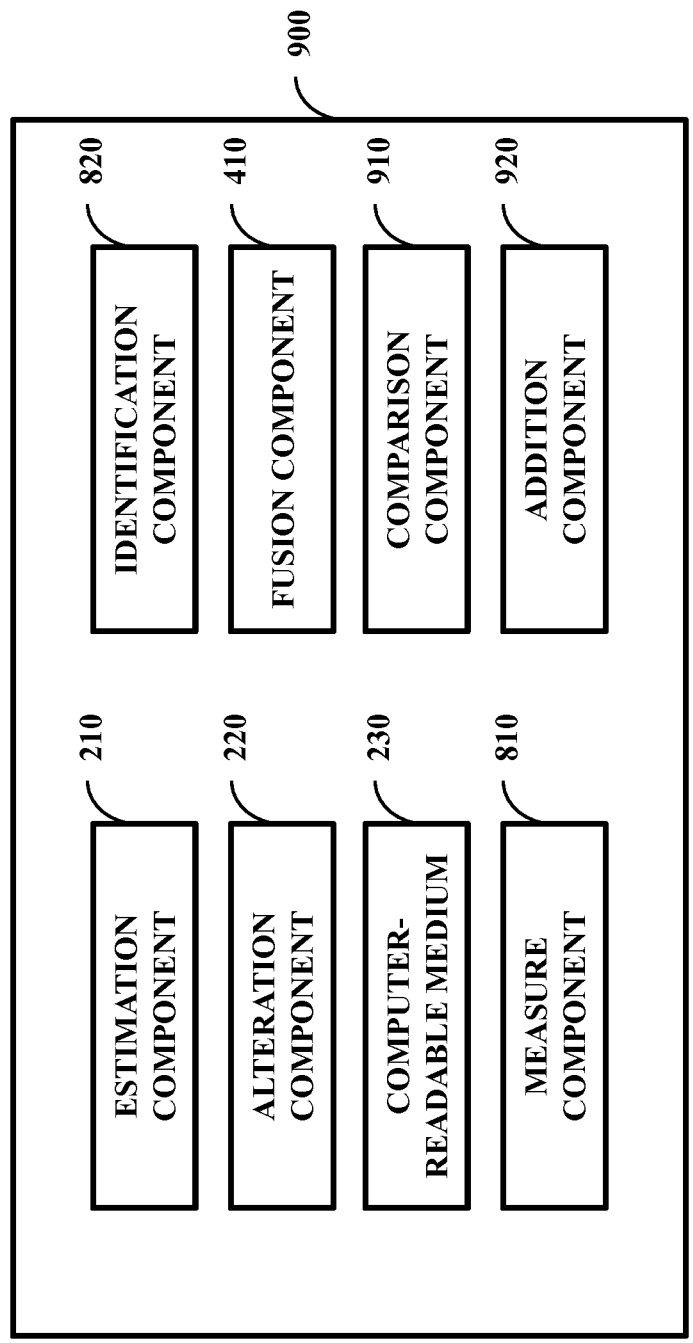
FIG. 9 illustrates one embodiment of a system comprising the estimation component, the alteration component, the computer-readable medium, the measure component, the identification component, the fusion component, a comparison component, and an addition component.

FIG. 9 illustrates one embodiment of a system 900 comprising the estimation component 310, the alteration component 320, the computer-readable medium 330, the measure component 810, the identification component 820, the fusion component 410, a comparison component 910, and an addition component 920. The comparison component 910 is configured to make a comparison of a SNR of the combined signal against a threshold, where the comparison produces a comparison result and where the measure component 810 is configured to measure (e.g., coarsely measure) the SNR of the combined signal. The addition component 920 is configured to cause the fusion component 410 to combine the edition of the signal of interest not already combined into the combined signal in response to the comparison result being that the SNR of the combined signal does not meet the threshold. If the SNR of the combined signal does meet the threshold, then the system 900 can delete the edition of the signal of interest not already combined into the combined signal and can use the combined signal for further processing.

In one embodiment, a plurality of sensors can be employed that transfer editions of the signal of interest. Combining all received editions of the signal of interest can be time consuming, resource intensive, and cause the combined signal to be less valuable than a signal with less than all received editions. The system 800 can function such that signal editions are evaluated based on their SNR and signal editions with the lowest SNR are combined into the combined signal. The system 800 can function in an iterative fashion such that the editions can be combined into the combined signal one-by-one and after a combination a check can be made if the SNR of the combined signal meets the threshold (e.g., reaches the threshold, exceeds the threshold, does not surpass the threshold, etc.).

Figure 10:
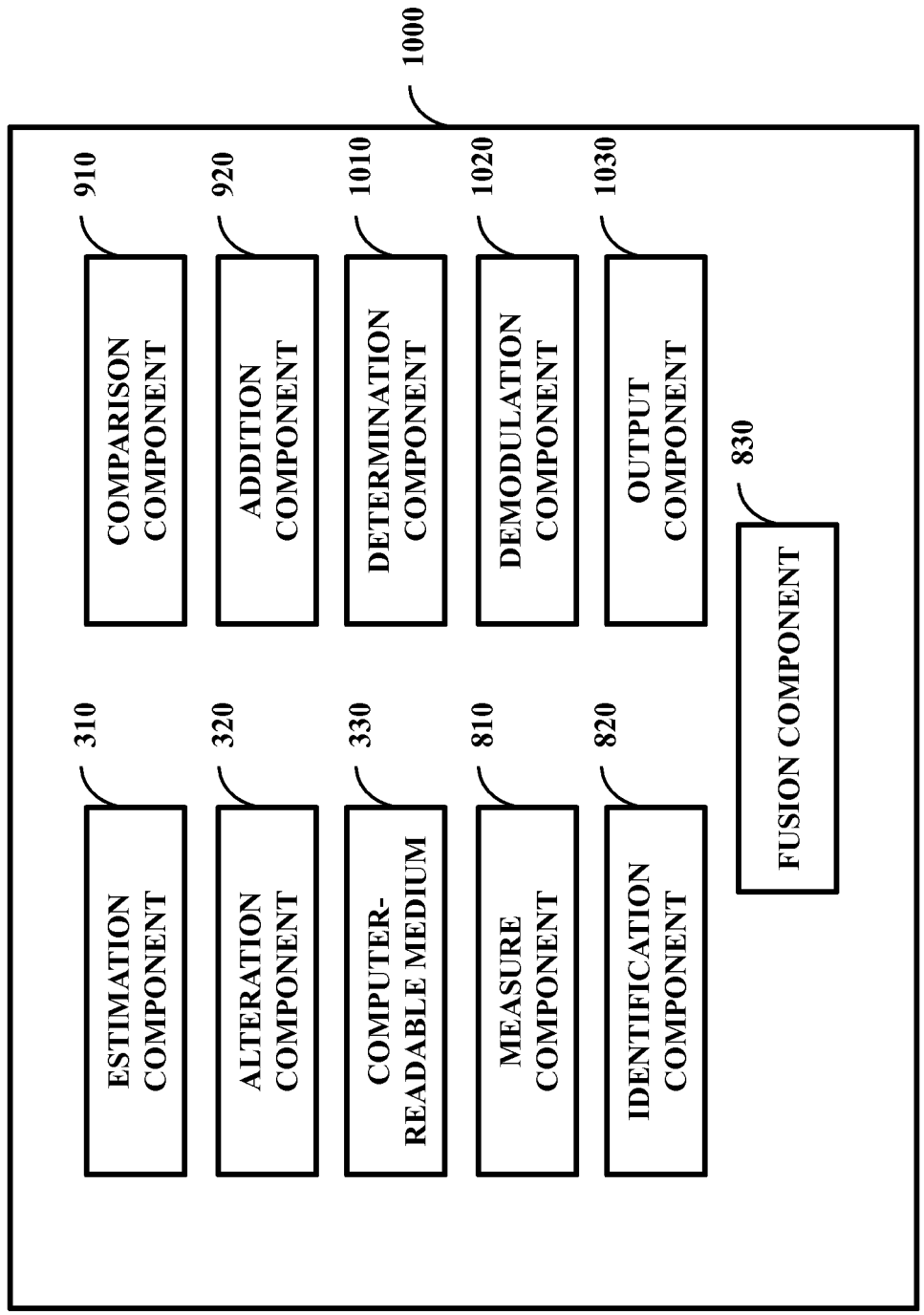
FIG. 10 illustrates one embodiment of a system comprising the estimation component, the alteration component, the computer-readable medium, the measure component, the identification component, the fusion component, the comparison component, the addition component, a determination component, a demodulation component, and an output component.

FIG. 10 illustrates one embodiment of a system 1000 comprising the estimation component 310, the alteration component 320, the computer-readable medium 330, the measure component 810, the identification component 820, the fusion component 410, the comparison component 910, the addition component 920, a determination component 1010, a demodulation component 1020, and an output component 1030. The determination component 1010 is configured to determine a modulation scheme for the combined signal. The demodulation component 1020 is configured to demodulate the combined signal through use of the demodulation scheme. The output component 1030 is configured to cause an output of the combined signal after demodulation.

Figure 11:
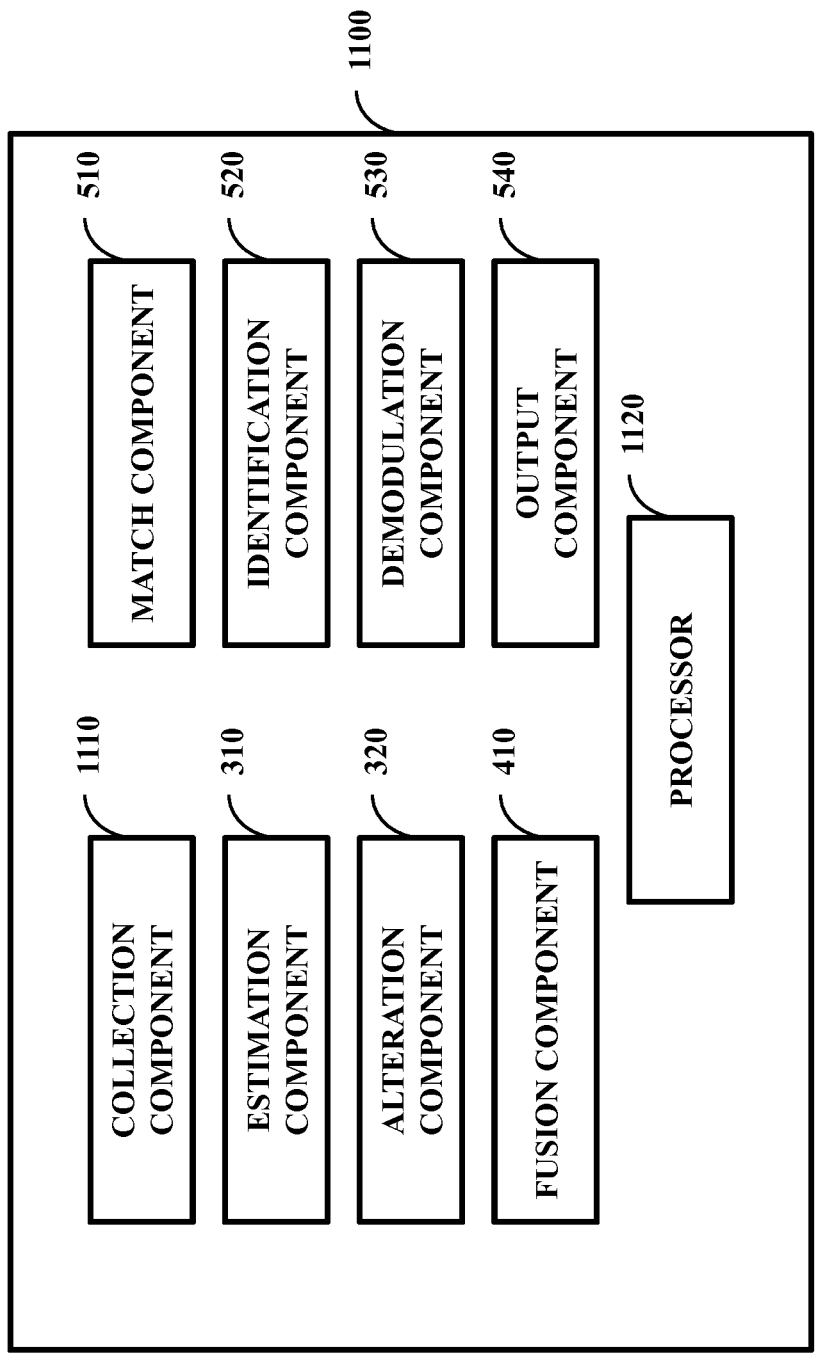
FIG. 11 illustrates one embodiment of a system comprising a collection component, the estimation component, the alteration component, the computer-readable medium, the fusion component, the match component, the identification component, the demodulation component, the output component, and the processor.

FIG. 11 illustrates one embodiment of a system 1100 comprising a collection component 1110, the estimation component 310, the alteration component 320, the computer-readable medium 330, the fusion component 410, the match component 510, the identification component 520, the demodulation component 530, the output component 540, and the processor 1120. The collection component 910 is configured to collect a first edition of a secondary signal along with a first edition of a signal of interest from a first sensor. The collection component 910 is also configured to collect a second edition of the secondary signal along with a second edition of the signal of interest from a second sensor. The first edition of the signal of interest is weaker in signal strength than the first edition of the secondary signal and the second edition of the signal of interest is weaker in signal strength than the secondary signal. The signal of interest and the secondary signal are different signals. A network of the signal of interest is unknown as is content of the secondary signal. The first sensor and the second sensor are different sensors. The estimation component 310 is configured to estimate an offset of a first edition of a secondary signal to a second edition of the secondary signal, where the offset comprises a relative frequency offset and a relative phase offset. The alteration component 320 is configured to alter the second edition of the signal of interest in accordance with the offset. The fusion component 410 is configured to combine the altered second edition of the signal of interest with the first edition of the signal of interest. The match component 510 is configured to match the combined signal of interest with a known signal. The identification component 520 is configured to make an identification of a modulation scheme of the known signal. The demodulation component 530 is configured to demodulate the combined signal of interest through use of the modulation scheme of the known signal. The output component 540 is configured to cause the demodulated signal of interest to be outputted. The processor 1120 is configured to execute at least one instruction related to at least one of the components.

Figure 12:
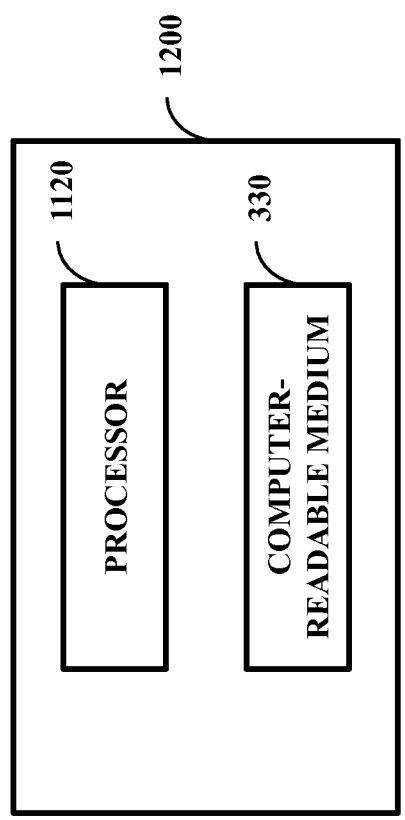
FIG. 12 illustrates one embodiment of a system comprising the processor and the computer-readable medium.

FIG. 12 illustrates one embodiment of a system 1200 comprising the processor 1120 and the computer-readable medium 330. In one embodiment, the computer-readable medium 330 is communicatively coupled to the processor 1120 and stores processor executable commands to facilitate operation of at least one component described herein. In one embodiment, the computer-readable medium 330 is non-transitory and is configured to store computer-executable instructions that when executed by the processor 1120 cause the processor 1120 to perform a method, such as the method 1300 described below.

Figure 13:
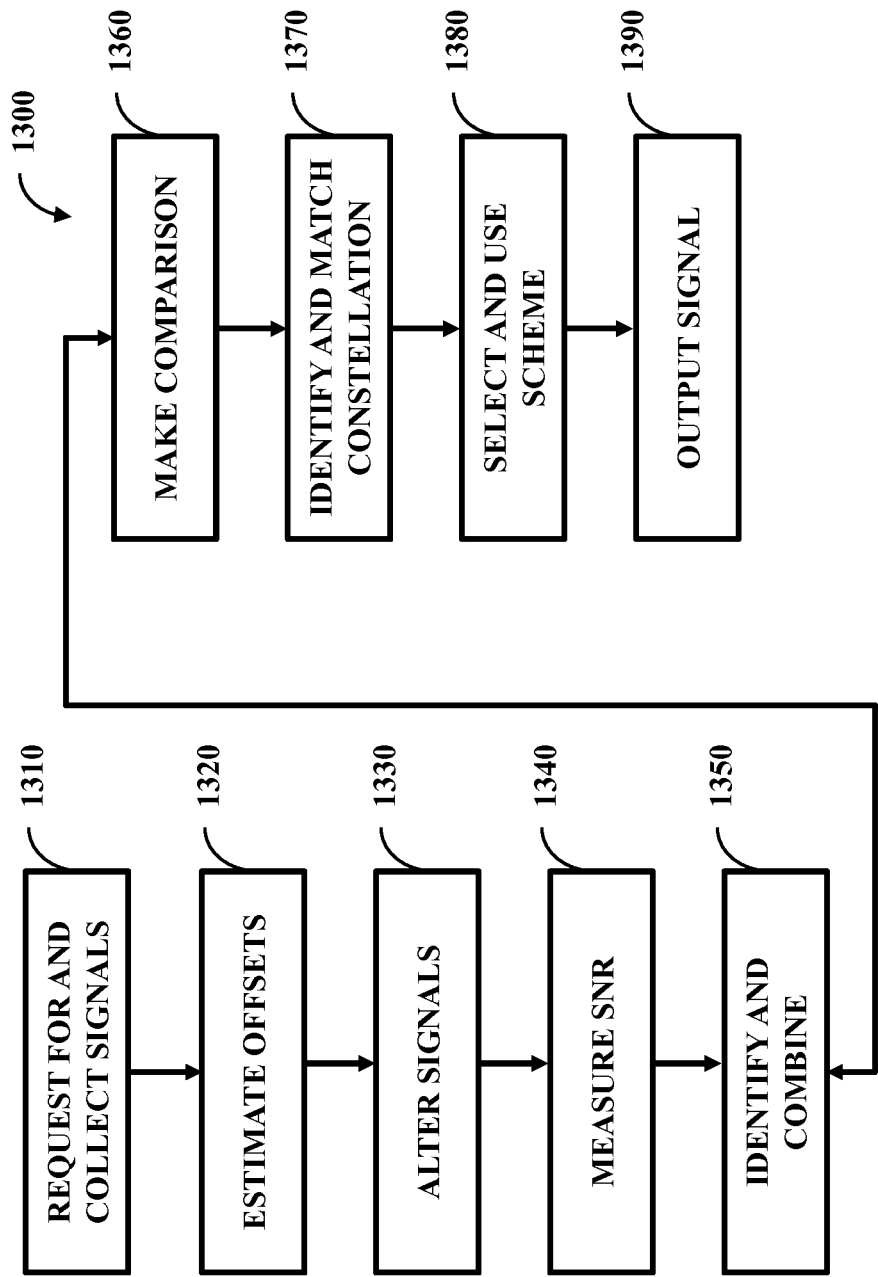
FIG. 13 illustrates one embodiment of a method comprising actions.

FIG. 13 illustrates one embodiment of a method 1300 comprising actions 1310-1390. At 1310 there is sending a request for a signal of interest. At 1310 there is also collecting a first signal edition of a signal of interest along with a first signal edition of a secondary signal from a first sensor, where the first signal edition of the secondary signal is stronger than the first signal edition of the signal of interest and where the signal of interest and the secondary signal are different signals. Additionally at 1310 there is collecting a second signal edition of the signal of interest along with a second signal edition of the secondary signal from a second sensor, where the second signal edition of the secondary signal is stronger than the second signal edition of the signal of interest where the first sensor and the second sensor are different sensors. Further, at 1310 there is collecting a third signal edition of the signal of interest along with a third signal edition of the secondary signal from a third sensor, where the third signal edition of the secondary signal is stronger than the third signal edition of the signal of interest, where the first sensor and third sensor are different sensors, and where the second sensor and the third sensor are different sensors. The first, second, and third sensors can be asynchronous and can send their respective editions as responses to the request for the signal of interest.

At 1320 estimating an offset of a first edition of a secondary signal to a second edition of the secondary signal occurs, where the first edition of the secondary signal is collected along with a first edition of a signal of interest from a first sensor, where the offset comprises a relative frequency offset and a relative phase offset. Also at 1320 there is estimating a third edition parameter offset of the third edition of the secondary signal against the first edition of the secondary signal, where the third edition parameter offset comprises a relative frequency third edition parameter offset and a relative phase third edition parameter offset. At 1330 there is altering the second edition of the signal of interest in accordance with the offset as well as altering the third edition of the signal of interest in accordance with the third edition parameter offset, where the third edition parameter offset is unequal to the second edition parameter offset.

At 1340 there is coarsely measuring a signal to noise ratio (SNR) for the first edition of the signal of interest, coarsely measuring an SNR for the second edition of the signal of interest (e.g., after alteration), and coarsely measuring an SNR for the third edition of the signal of interest (e.g., after alteration). At 1350 there is identifying two signal editions of the signal of interest with the highest SNRs as well as combining the two signal editions of the signal of interest with the highest SNR into a combined signal (e.g., from among the first edition, second edition (e.g., after alteration), and third edition (e.g., after alteration) of the signal of interest), where at least one of the two editions of the signal of interest with the highest SNR are in an offset altered form (e.g., the second edition of the signal of interest after being altered in accordance with the second edition parameter offset). At 1360 there is making a comparison of a SNR of the combined signal against a threshold. If the comparison result is that the SNR of the combined signal does not meet the threshold, then combining the edition of the signal of interest not already combined into the combined signal can occur at 1350. If the comparison result is that the SNR of the combined signal does meet the threshold (e.g., reaches the threshold, stays below the threshold, exceeds the threshold, etc.) or if there are no signal editions remaining to combine with the combined signal, then method 1300 can continue to 1370. Thus, 1360 can also include determining that the comparison is not appropriate since there are no more signal editions to combine.

At 1370 there is identifying a constellation of the combined signal. Also at 1370 there is matching the constellation of the combined signal with a constellation of a known signal. At 1380 there is selecting a demodulation scheme associated with the known signal. At 1380 there is also using the demodulation scheme to demodulate the combined signal through use of the demodulation scheme. At 1390 there is outputting the combined signal after demodulation.

Actions of the method 1300 can be combined into fewer actions, broken out into more actions, have actions added or removed, as well as have actions performed in a different sequence than listed when possible. In addition, while discussion herein relates to two or three sensors and signal editions, it is to be appreciated by one of ordinary skill in the art that more than two or three sensors can be employed in practicing aspects disclosed herein. Further, references to a numerical order of signals can function of a mere identifiers and not necessarily convey a ranking or order.

What is claimed is:

1. A system, comprising:
an estimation component configured to estimate an offset of a first edition of a secondary signal to a second edition of the secondary signal, where the first edition of the secondary signal is collected along with a first edition of a signal of interest from a first sensor, where the second edition of the secondary signal is collected along with a second edition of the signal of interest from a second sensor, where the first edition of the signal of interest is weaker in signal strength than the first edition of the secondary signal, where the second edition of the signal of interest is weaker in signal strength than the second edition of the secondary signal, where the signal of interest and the secondary signal are different signals, and where the first sensor and the second sensor are different sensors;
an alteration component configured to alter the first edition of the signal of interest in accordance with the offset; and
a non-transitory computer-readable medium configured to retain at least one executable instruction related to the collection component, the estimation component, the alteration component, or a combination thereof.

2. The system of claim 1, comprising:
a fusion component configured to combine the altered first edition of the signal of interest with the second edition of the signal of interest.

3. The system of claim 2, comprising:
a match component configured to match the combined signal of interest with a known signal;
an identification component configured to make an identification of a modulation scheme of the known signal;
a demodulation component configured to demodulate the combined signal of interest through use of the modulation scheme of the known signal; and
an output component configured to cause the demodulated signal of interest to be outputted.

4. The system of claim 2, comprising:
a resample component configured to resample the altered first edition of the signal of interest, where the fusion component is configured to combine the altered first edition of the signal of interest after being resampled with the second edition of the signal of interest.

5. The system of claim 2, comprising:
an interference component configured to make an identification that the secondary signal interferes with the signal of interest;
a reciprocation component configured to take a reciprocal of the first edition of the secondary signal and to take a reciprocal of the second edition of the secondary signal; and
a suppression component configured to suppress the first edition of the secondary signal through use of the reciprocal of the first edition of the secondary signal and configured to suppress the second edition of the secondary signal through use of the reciprocal of the second edition of the secondary signal, where the alteration component is configured to alter the first edition of the signal of interest in accordance with the offset after the first edition of the secondary signal is suppressed and where the fusion component is configured to combine the altered first edition of the signal of interest with the second edition of the signal of interest after the second edition of the secondary signal is suppressed.

6. The system of claim 1, where the first edition of the signal of interest and the first edition of the secondary signal are captured by the first sensor in a single snapshot.

7. The system of claim 1, where the first edition of the signal of interest and the first edition of the secondary signal are captured by the first sensor in the same signal copy.

8. The system of claim 1, where the second edition of the signal of interest and the second edition of the secondary signal are captured by the second sensor at different times.

9. The system of claim 1, where the second edition of the signal of interest and the second edition of the secondary signal are captured by the second sensor in different signal copies.

10. The system of claim 1, where a network of the signal of interest is unknown.

11. The system of claim 1, where content of the secondary signal is unknown.

12. The system of claim 1, comprising:
a measure component configure to:

measure a signal to noise ratio (SNR) for the first edition of the signal of interest;
measure an SNR for the second edition of the signal of interest; and
measure an SNR for a third edition of the signal of interest, where the third edition of the signal of interest is collected by a third sensor, where the third sensor is different from the first sensor, and where the third sensor is different from the second sensor;
an identification component configured to identify two editions of the signal of interest with the highest SNRs among the first edition of the signal of interest, the second edition of the signal of interest, and the third edition of the signal of interest; and
a fusion component configured to combine the two editions of the signal of interest with the highest SNR into a combined signal, where at least one of the two editions of the signal of interest with the highest SNR is offset altered after collection.

13. The system of claim 12, comprising:
a comparison component configured to make a comparison of a SNR of the combined signal against a threshold, where the comparison produces a comparison result and where the measure component is configured to measure the SNR of the combined signal; and
an addition component configured to cause the fusion component to combine the edition of the signal of interest not already combined into the combined signal in response to the comparison result being that the SNR of the combined signal does not meet the threshold.

14. The system of claim 13, comprising:
a determination component configured to determine a modulation scheme for the combined signal;
a demodulation component configured to demodulate the combined signal through use of the demodulation scheme; and
an output component configured to cause an output of the combined signal after demodulation.

15. The system of claim 1, where the offset comprises a relative frequency offset and a relative phase offset.

16. The system of claim 15, where the offset comprises a relative time offset.

17. The system of claim 1, where the first sensor is part of a first electronic device with a primary purpose other than functioning as a sensor of the first edition of the signal of interest, where the second sensor is part of a second electronic device with a primary purpose other than functioning as a sensor of the second edition of the signal of interest, and where the first electronic device and the second device are different electronic devices.

18. The system of claim 1, where the first sensor and the second sensor are part of different networks.

19. A system, comprising:
a collection component configured to collect a first edition of a secondary signal along with a first edition of a signal of interest from a first sensor and configured to collect a second edition of the secondary signal along with a second edition of the signal of interest from a second sensor, where the first edition of the signal of interest is weaker in signal strength than the first edition of the secondary signal, where the second edition of the signal of interest is weaker in signal strength than the secondary signal, where the signal of interest and the secondary signal are different signals, where a network of the signal of interest is unknown, where content of the secondary signal is unknown, and where the first sensor and the second sensor are different sensors;
an estimation component configured to estimate an offset of the second edition of the secondary signal to the first edition of the secondary signal, where the offset comprises a relative frequency offset and a relative phase offset;
an alteration component configured to alter the second edition of the signal of interest in accordance with the offset;
a fusion component configured to combine the altered second edition of the signal of interest with the first edition of the signal of interest;
a match component configured to match the combined signal of interest with a known signal;
an identification component configured to make an identification of a modulation scheme of the known signal;
a demodulation component configured to demodulate the combined signal of interest through use of the modulation scheme of the known signal;
an output component configured to cause the demodulated signal of interest to be outputted; and
a processor configured to execute at least one instruction related to at least one of the components.

20. A non-transitory computer-readable medium configured to store computer-executable instructions that when executed by a processor cause the processor to perform a method, the method comprising:
sending a request for a signal of interest;
collecting a first edition of the signal of interest along with a first edition of a secondary signal from a first sensor, where the first edition of the secondary signal is stronger than the first edition of the signal of interest, where the signal of interest and the secondary signal are different signals, and where the first sensor sends the first edition of the signal of interest along with the first edition of the secondary signal as a first response to the request for the signal of interest;
collecting a second edition of the signal of interest along with a second edition of the secondary signal from a second sensor, where the second edition of the secondary signal is stronger than the second edition of the signal of interest, where the first sensor and the second sensor are different sensors, and where the second sensor sends the second edition of the signal of interest along with the second edition of the secondary signal as a second response to the request for the signal of interest;
collecting a third edition of the signal of interest along with a third edition of the secondary signal from a third sensor, where the third edition of the secondary signal is stronger than the third edition of the signal of interest, where the first sensor and third sensor are different sensors where the second sensor and the third sensor are different sensors, where the third sensor sends the third edition of the signal of interest along with the third edition of the secondary signal as a third response to the request for the signal of interest, and where the first sensor, second sensor, and third sensor are asynchronous;
estimating a second edition parameter offset of the second edition of the secondary signal against the first edition of the secondary signal, where the second edition parameter offset comprises a relative frequency second edition parameter offset and a relative phase second edition parameter offset;
altering the second edition of the signal of interest in accordance with the second edition parameter offset;
estimating a third edition parameter offset of the third edition of the secondary signal against the first edition of the secondary signal, where the third edition parameter offset comprises a relative frequency third edition parameter offset and a relative phase third edition parameter offset;

altering the third edition of the signal of interest in accordance with the third edition parameter offset, where the third edition parameter offset is unequal to the second edition parameter offset;

coarsely measuring a signal to noise ratio (SNR) for the first edition of the signal of interest;

coarsely measuring an SNR for the second edition of the signal of interest after alteration;

coarsely measuring an SNR for the third edition of the signal of interest after alteration;

identifying two editions of the signal of interest with the highest SNRs;

combining the two editions of the signal of interest with the highest SNR into a combined signal, where at least one of the two editions of the signal of interest with the highest SNR are in an offset altered form;

making a comparison of a SNR of the combined signal against a threshold, where the comparison produces a comparison result;

combining the edition of the signal of interest not already combined into the combined signal in response to the comparison result being that the SNR of the combined signal does not meet the threshold;

identifying a constellation of the combined signal in response to the comparison result being that the SNR of the combined signal does meet the threshold or in response to there being no editions remaining to combine with the combined signal;

matching the constellation of the combined signal with a constellation of a known signal;

selecting a demodulation scheme associated with the known signal;

using the demodulation scheme to demodulate the combined signal through use of the demodulation scheme; and outputting the combined signal after demodulation.

* * * * *